United States Patent

Meyer

[11] Patent Number: 5,993,693
[45] Date of Patent: Nov. 30, 1999

[54] ZWITTERIONIC WATER-SOLUBLE SUBSTITUTED IMINE CORROSION INHIBITORS

[75] Inventor: G. Richard Meyer, Missouri City, Tex.

[73] Assignee: Nalco/Exxon Energy Chemicals, L.P., Sugar Land, Tex.

[21] Appl. No.: 09/188,519

[22] Filed: Nov. 9, 1998

[51] Int. Cl.$^6$ .............................. C09K 3/00; C23C 22/00; C10G 1/18; C04B 9/02
[52] U.S. Cl. .......................... 252/390; 252/394; 148/243; 148/274; 208/47; 208/48; 106/14.12; 106/14.13; 106/14.15; 106/14.18; 106/14.27; 106/14.31; 422/7; 422/12
[58] Field of Search ...................................... 252/390, 394; 148/243, 274; 208/47, 48; 106/14.12, 14.13, 14.15, 14.18, 14.31, 14.27; 422/7, 12

[56] References Cited

U.S. PATENT DOCUMENTS

| | | |
|---|---|---|
| 2,742,498 | 4/1956 | Smith et al. . |
| 3,197,403 | 7/1965 | Riggs, Jr. . |
| 3,649,167 | 3/1972 | Sawyer . |
| 4,344,861 | 8/1982 | Levy . |
| 4,490,293 | 12/1984 | Oude Alink . |
| 4,642,221 | 2/1987 | Hansen et al. . |
| 5,078,966 | 1/1992 | Strong et al. . |
| 5,147,567 | 9/1992 | Agarwala et al. . |
| 5,211,840 | 5/1993 | Lehrer et al. . |
| 5,300,235 | 4/1994 | Clewlow et al. . |
| 5,322,630 | 6/1994 | Williams et al. . |
| 5,322,640 | 6/1994 | Byrne et al. . |
| 5,427,999 | 6/1995 | Clewlow et al. . |
| 5,556,575 | 9/1996 | Babaian-Kibala et al. . |
| 5,714,664 | 2/1998 | Fearnside et al. . |

FOREIGN PATENT DOCUMENTS

| | | |
|---|---|---|
| 0 275 651 A1 | 7/1988 | European Pat. Off. . |
| 74021024 | 5/1974 | Japan . |
| 8-277264 | 10/1996 | Japan . |
| 318315 | 3/1978 | U.S.S.R. . |

OTHER PUBLICATIONS

Corrosion Science, vol. 26, No. 10, pp. 827–837, (1986), "Schiff Bases as Corrosion Inhibitors for Mild Steel in Hydrochloric Acid Solutions", M. N. Deasi, M. B. Desai, C. B. Shah and S. M. Desai.

Materials Chemistry and Physics 39 (1995) 209–213, "Schiff Bases as Corrosion Inhibitors for Aluminium in Hydrochloric Acid Solution", Gamal K. Gomma, Mostafa H. Wahdan.

*Primary Examiner*—C. H. Kelly
*Assistant Examiner*—Monique T. Cole
*Attorney, Agent, or Firm*—Michael B. Martin; Thomas M. Breininger

[57] ABSTRACT

Zwitterionic water-soluble imine corrosion inhibitors of the general formula:

wherein $R^3$ is an anionically charged group.
Preferred zwitterionic imines are the reaction products of the Michael addition of acrylic acid to an imine.

11 Claims, No Drawings

ZWITTERIONIC WATER-SOLUBLE SUBSTITUTED IMINE CORROSION INHIBITORS

FIELD OF THE INVENTION

Zwitterionic water-soluble imine corrosion inhibitors of the general formula:

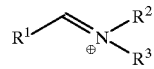

wherein $R^3$ is an anionically charged group.
Preferred zwitterionic imines are the reaction products of the Michael addition of acrylic acid to an imine.

BACKGROUND OF THE INVENTION

This invention relates to a method for inhibiting the corrosion of ferrous metals. More particularly, this invention concerns a method for inhibiting corrosion of a ferrous metal subjected to aqueous acid environments. In narrower aspects, the present invention relates to an acidizing process for the removal of calcareous scale formations from a ferrous metal surface whereby corrosive attack of the metal substrate is inhibited.

In many industrial practices, the need to contact ferrous metal surfaces with strong acidic agents constantly arises. Particularly under numerous industrial circumstances equipment fabricated of ferrous metals such as boilers often accumulate scale formations which must be periodically removed in order to maintain the efficiency of the equipment involved. For example, it is common within the petroleum industry to utilize heater tubes in contact with crude oil containing emulsified aqueous solutions of inorganic salts, particularly those of calcium, in order to effect separation of oil and water. The briny solution, upon contacting the heated metallic surfaces, deposits a substantial portion of mineral content upon said surfaces in a form of insoluble calcareous formations. Consequently, in order to maintain reasonable efficiency of the heaters and to obviate burning out of the heater tubes it is necessary to remove the scale formations periodically that have formed. The latter is but one example of many of such operations in the petroleum field which requires frequent acidizing treatment of various pieces of equipment made of iron or a ferrous alloy. Also in many chemical processes it is necessary to store or transport acids, such as the common mineral acids, while in contact with ferrous metals. Accordingly, it can be seen that the practical situations necessitating the minimizing or obviating of the corrosive effect acidic materials, especially those of mineral origin, upon ferrous metal surfaces are legion.

Flow-induced localized corrosion (FILC) is a result of high shear conditions present in flow lines. The amount of corrosion that occurs is dependent on a variety of factors including the corrosiveness of the fluid flowing through the lines, the metallurgy of the line and the ability of added corrosion inhibitors to maintain adhesion to the interior of the line.

The ability of added corrosion inhibitors to maintain adhesion to the interior of the line depends on both the chemical adhesive properties of the inhibitor and the shear stress conditions which exist inside the line. A number of products have shown promise as shear-resistant corrosion inhibitors. Included among the corrosion inhibitors are amides and quaternized amines and amide amine salts.

Many nitrogen-containing corrosion inhibitors are known. Among them are: morpholine, disclosed in U.S. Pat. No. 3,649,167; imidazolines in U.S. Pat. No. 3,197,403; amidic acids in U.S. Pat. No. 2,742,498; bis-amides in U.S. Pat. No. 4,344,861; amines in U.S. Pat. Nos. 5,211,840 and 5,714,664; amides in U.S. Pat. No. 5,556,575; and carbohydrazides in U.S. Pat. No. 5,078,966. The reaction of acrylic acid with substituted imidazolines to form various amine derivative corrosion inhibitors has been disclosed in U.S. Pat. Nos. 5,300,235; 5,322,630; 5,322,640 and 5,427,999.

Schiff bases have been disclosed as corrosion inhibitors in U.S. Pat. No. 5,147,567, in *Materials Chemistry and Physics.* 39 (1995) 209–213 and in *Corrosion Science,* 26 (1986) 827–837. Moreover, imines have also been disclosed as corrosion inhibitors, and as additives to corrosion inhibitor formulations. For example, imines have been disclosed as useful in conjunction with aromatic triazoles to enhance corrosion inhibition in U.S. Pat. No. 4,642,221; and imine dispersants have been utilized to enhance the activity of trithiones as $CO_2$ corrosion inhibitors in EP 0 275 651. Imines have been disclosed as corrosion inhibitors in U.S. Pat. No. 4,490,293; JP 74021024B and SU 318315A. However, none of these references recognize the corrosion inhibiting characteristics of zwitterionc imines, which I have discovered.

It is one of the objects of this invention to provide a process whereby ferrous metal surfaces can be subjected to corrosive environments without the occurrence of an untoward degree of corrosion.

SUMMARY OF THE INVENTION

Zwitterionic water-soluble imine corrosion inhibitors of the general formula:

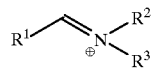

wherein $R^3$ is an anionically charged group.
Preferred zwitterionic imines are the reaction products of the Michael addition of acrylic acid to an imine.

DESCRIPTION OF THE INVENTION

The corrosion inhibitors which I have discovered are zwitterionic Schiff bases (also called zwitterionic substituted imines). Useful zwitterionic imines are of the following general structure:

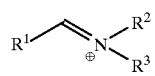

One aspect of the invention is a method of inhibiting corrosion in metallic flow lines for carrying fluids comprising: adding to said fluids a corrosion inhibiting amount of a zwitterionic water-soluble substituted imine having the following formula:

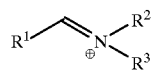

wherein $R^1$ is selected from the group consisting of: heterocyclic groups, heteroaromatic groups, aromatic groups, alkylaryl groups, cycloalkyl groups, straight-chain alkyl groups, and branched-chain alkyl groups, $R^2$ is selected from the group consisting of: straight-chain alkyl groups, branch-chain alkyl groups, alkylidene amines, alkylidene diamines, alcohols, alkyl ethers, thioethers and alkylaryl groups, and $R^3$ is an anion selected from the group consisting of: carboxylates, carbonates, sulfites, sulfates, phosphites and phosphates.

The zwitterionic imine may be of the formula:

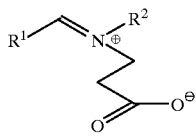

wherein $R^1$ is selected from the group consisting of: heterocyclic groups, heteroaromatic groups, aromatic groups, alkylaryl groups, cycloalkyl groups, straight-chain alkyl groups, and branched-chain alkyl groups and $R^2$ is selected from the group consisting of: straight-chain alkyl groups, branch-chain alkyl groups, alkylidene amines, alkylidene diamines, alcohols, alkyl ethers, thioethers and alkylaryl groups.

Another aspect of the invention is a composition comprising:

a) a zwitterionic water-soluble imine of the formula:

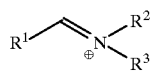

wherein $R^1$ is selected from the group consisting of: heterocyclic groups, heteroaromatic groups, aromatic groups, alkylaryl groups, cycloalkyl groups, straight-chain alkyl groups, and branched-chain alkyl groups, $R^2$ is selected from the group consisting of: straight-chain alkyl groups, branch-chain alkyl groups, alkylidene amines, alkylidene diamines, alcohols, alkyl ethers, thioethers and alkylaryl groups, and $R^3$ is an anion selected from the group consisting of: carboxylates, carbonates, sulfites, sulfates, phosphites and phosphates;

b) a water soluble surfactant; and, c) water.

Yet another aspect of the invention is a composition comprising:

a) a zwitterionic water-soluble imine of the following formula:

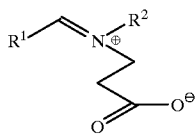

wherein $R^1$ is selected from the group consisting of: heterocyclic groups, heteroaromatic groups, aromatic groups, alkylaryl groups, cycloalkyl groups, straight-chain alkyl groups, and branched-chain alkyl groups and $R^2$ is selected from the group consisting of: straight-chain alkyl groups, branch-chain alkyl groups, alkylidene amines, alkylidene diamines, alcohols, alkyl ethers, thioethers and alkylaryl groups.

b) a water-soluble surfactant selected from the group consisting of: ethoxylated alkyl amine and ethoxylated nonylphenol;

c) a pour point depressant selected from the group consisting of: alcohols and glycols;

d) a co-inhibitor selected from the group consisting of: amides, quaternized amines and amide amine salts;

e) a filming agent selected from the group consisting of: p-toluene sulfonic acid and dodecylbenzene sulfonic acid; and, f) water.

Moreover, $R^2$ can be a hydrocarbon group which is straight or branched, saturated or unsaturated, completely aliphatic, or contain aromatic substituents. Preferably, the hydrocarbon group is straight chain aliphatic and is saturated. Preferably, the hydrocarbon contains from about 12 to about 24 carbon atoms, more preferably from about 16 to about 20 carbon atoms. It is preferred that $R^2$ be the hydrocarbon residue of a naturally occurring fatty acid, which is optionally hydrogenated such as the residue of caproic, caprylic, lauric, myristic, palmitic, stearic, palmitoleic, oleic, linoleic or linolenic acid. Fatty amines are readily available in which the fatty portion is a mixture of hydrocarbon groups. For example, the amine, diamine, triamine of hydrocarbon residues of coconut or tallow oil are readily available.

More specifically, the imines are of the following structure:

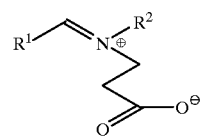

Some specific examples of compounds made and tested which fall under the general structure above include the following imines:

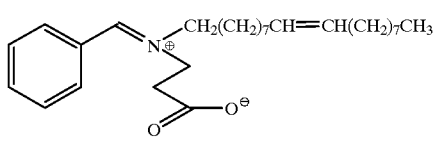

3-(benzylidene-N-oleyliminium) propionate

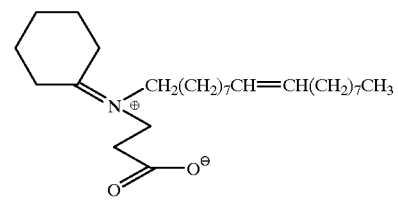

3-(cyclohexylidene-N-oleyliminium) propionate

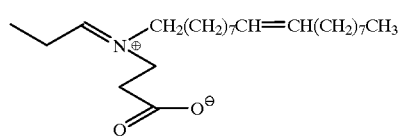

3-(propylidene-N-oleyliminium) propionate

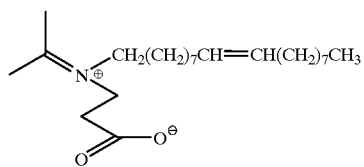

3-(isopropylidene-N-oleyliminium) propionate

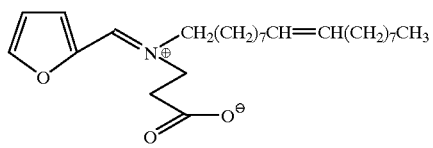

3-(furylidene-N-oleyliminium) propionate

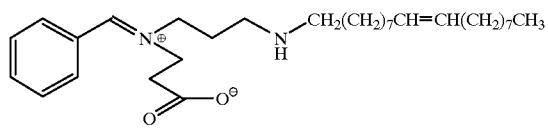

3-(benzylidene-N-(oleylaminopropyl) iminium) propionate

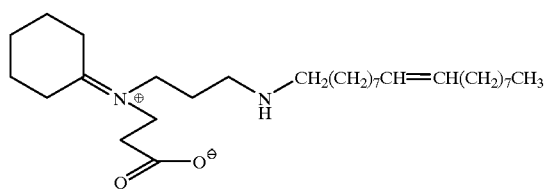

3-(cyclohexylidene-N-(oleylaminopropyl) iminium) propionate

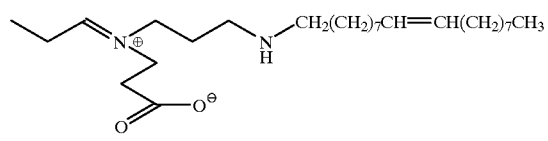

3-(propylidene-N-(oleylaminopropyl) iminium) propionate

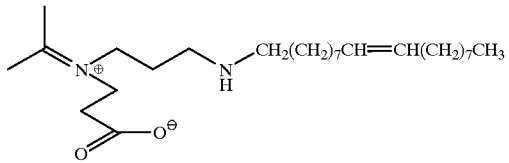

3-(isopropylidene-N-(oleylaminopropyl) iminium) propionate

The corrosion inhibitor may be added to the oil field liquids in the form of a solution or dispersion in water or an organic solvent. Examples of suitable solvents are alcohols such as methanol, ethanol, isopropanol, isobutanol, secondary butanol, glycols and aliphatic and aromatic hydrocarbons.

The amount of active ingredient in the corrosion inhibitor formulation required to achieve sufficient corrosion protection varies with the system in which it is used. Methods for monitoring the severity of corrosion in different systems are well known, and may be used to decide the effective amount of active ingredient required in a particular situation. The compounds may be used to impart the property of corrosion inhibition to a composition for use in an oil or gas field application and which may have one or more functions other than corrosion inhibition, e.g. scale inhibition.

The imines described herein have been shown to be extremely effective for inhibiting mild steel corrosion, in hydrocarbon, oil/brine mixtures and aqueous systems under a variety of conditions. The inhibitor is most successful on sweet systems, or systems having a high $CO_2$ content. However, use of the compound in systems having sour conditions (high $H_2S$ concentration) is also acceptable. Although fluid content of the flow lines may vary, the inhibitor may be used in a variety of environments. Oil cuts in the field can range from less than 1% (oil field) to 100% (refinery) oil, while the nature of the water can range from 0–300,000 ppm TDS (total dissolved solids). In addition, this material would not only be useful in the large diameter flow lines (LDF's) of from about 1 inch to about 4 feet in diameter, but would also work in small gathering lines, small flow lines and headers. In the preferred method, the imine inhibitor is added at any point in the flow line upflow from the point at which corrosion prevention is desired.

In practice, the imine inhibitor is preferably added to the flow line continuously to maintain a corrosion inhibiting dose of from about 0.01 to about 5,000 ppm. More preferably, the corrosion inhibiting dose is from about 1 to about 500 ppm. In the most preferred embodiment of the invention, the corrosion inhibiting dose is from about 1 to about 250 ppm. Although a most preferred use of the compound in the claimed method is for metallic flow lines comprising mild steel, it is believed that the inhibitor is also effective in inhibiting the corrosion in other types of metallurgy. In certain cases, batch treatments are the method of choice for application of the imine inhibitor. Dosage rates for batch treatments range from about 0.1 to about 50,000 ppm. In the preferred embodiment of the invention, the flow rate of the flow line in which the inhibitor is used is between 0 to 65 feet per second. A more preferred flow rate is between 0 to 40 feet per second. A still more preferred flow rate is between 0 and 35 feet per second. In some cases, the imine may be formulated in water in order to facilitate addition to a flow line.

The imine may be used alone or in combination with other compounds. Typical formulations of the imine may use alcohols or glycols as pour point depressants or surfactants, such as ethoxylated nonylphenols and/or ethoxylated amines as wetting agents or additives for dispersing the imine into the stream into which it is added. Typical alcohols are $C_1-C_3$ linear or branched alkyl groups and are used as pour point depressants. Useful glycols include ethylene and propylene glycols and are also used as pour point depressants. Surfactants utilized should be water soluble and allow the product to better wet the surface of the flow line where corrosion may take place. Water soluble surfactants utilized may be non-ionic, cationic, or anionic and will generally have a hydrophilic-lipophilic balance (HLB) value of about 1. Oil soluble surfactants may be utilized if it is desired to disperse the imine composition into a hydrocarbon fluid. Oil soluble surfactants may be non-ionic, cationic or anionic. These surfactants typically have an HLB value less than 7.

Other compounds which may also be blended with the imine are quaternary amines, such as fatty, cyclic or aromatic amines quaternized with lower alkyl halides or benzyl chloride and certain amides. In addition, formulations including the imine inhibitor may include filming agents such as p-toluene sulfonic acid and dodecylbenzene sulfonic acid. The corrosion inhibitor may also contain the materials which are typically included in corrosion inhibiting compositions e.g. scale inhibitors and/or surfactants. In some instances, it may be desirable to include a biocide in the composition.

A formulation which has been found to give superior performance is as follows:

The formulation may be created by blending several ingredients into a homogeneous mixture. A preferred order of addition is as follows: a) imine, b) methanol or isopropanol c) alkyl pyridine benzyl chloride quaternary salt wherein the alkyl group is a methyl, ethyl or disubstituted group, ethoxylate alkyl having a certain carbon length of from about $C_{10}$ to about $C_{30}$ and having 20 moles of ethylene oxide per mole of amine, water and p-toluene sulfonic acid. The order of addition is not critical to the invention as long as the resulting mixture is homogeneous. A representative formulation is as follows:

TABLE I

| Starting Materials | Product Name | Inhibitor |
| --- | --- | --- |
| TOFA/DETA[1] imidazoline + propionaldehyde | propylidene TOFA/DETA imidazoline | 1 |
| TOFA/DETA[1] imidazoline + furfuraldehyde | furylidene TOFA/DETA imidazoline | 2 |
| TOFA/DETA[1] imidazoline monoamide + propionaldehyde | propylidene TOFA/DETA amide | 3 |
| benzal oleylamine + acrylic acid | 3-(benzylidene-N-oleyliminium) propionate | 4 |
| cyclohexylidene oleylamine + acrylic acid | 3-(cyclohexylidene-N-oleyliminium) propionate | 5 |
| n-propylidene oleylamine + acrylic acid | 3-(propylidene-N-oleyl iminium) propionate | 6 |
| iso-propylidene oleylamine + acrylic acid | 3-(isopropylidene-N-oleyliminium) propionate | 7 |
| furfurylidene oleylamine + acrylic acid | 3-(furylidene-N-oleyl iminium) propionate | 8 |
| benzal oleyldiamine + acrylic acid | 3-(benzylidene-N-(oleylaminopropyl) iminium propionate | 9 |
| cyclohexylidene oleyldiamine + acrylic acid | 3-(cyclohexylidene-N-(oleylaminopropyl) iminium) propionate | 10 |
| n-propylidene oleyldiamine + acrylic acid | 3-(propylidene-N-(oleyl aminopropyl) iminium) propionate | 11 |
| iso-propylidene oleyldiamine + acrylic acid | 3-(isopropylidene-N-(oleylaminopropyl) iminium) propionate | 12 |
| furfurylidene oleyldiamine + acrylic acid | 3-furylidene-N-oleylaminopropyl) iminium) propionate) | 13 |
| dodecylidene oleyldiamine + acrylic acid | 3-(dodecylidene-N-(oleylaminopropyl) iminium) propionate | 14 |
| dodecylidene ethanolamine + acrylic acid | 3-(dodecylidene-N-(hydroxyethyl) iminium) propionate | 15 |
| propylidene TOFA/DETA[1] imidazoline + acrylic acid | 3-(2-(propylidene TOFA/DETA[1] imidazolinium)) propionate | 16 |

[1] = product of reaction of tall oil fatty acid and diethylene triamine in 1:1 mole ratio

| Compound | % by weight |
| --- | --- |
| water | 10–60 |
| methanol | 5–30 |
| isopropanol | 5–30 |
| p-toluene sulfonic acid | 0–5 |
| ethoxylated alkyl amine surfactant | 2–15 |
| imine corrosion inhibitor | 5–50 |
| alkyl pyridine benzyl chloride quat | 0–15 |

The inhibitor formulation may be used in a variety of petroleum operations in the gas and oil industry. It can be used in primary, secondary and tertiary oil recovery and be added in known manner. Another technique is primary oil recovery where they can be used is the squeeze treating technique, whereby they are injected under pressure into the producing formation, are adsorbed onto the strata and absorbed as the fluids are produced. They can further be added in the water flooding operations of secondary oil recovery as well as be added to pipelines, transmission lines and refinery units. They may also be used to inhibit acid solution in well acidizing operations.

The following examples are presented to describe preferred embodiments and utilities of the invention and are not meant to limit the invention unless otherwise stated in the claims appended hereto.

EXAMPLE 1

The zwitterionic imine corrosion inhibitors of the instant invention are the result of Michael addition of acrylic acid to various imines under standard conditions to form the zwitterions. In a typical procedure, 0.1 mol of imine (prepared by combining an aldehyde or ketone with a primary amine in the standard manner) was placed in a round bottom 4-neck flask equipped with a stirrer, thermocouple and addition funnel. To the imine was added 0.1 mol of a commercial grade of acrylic acid (available from BASF of Parsippany, N.J.). The exotherm was noted and the mixture was then heated to 120° C. for two hours. Table I is representative of reactants and zwitterionic imine corrosion inhibitors which were synthesized in this manner. Products 1–3 are unacrylated imines, synthesized for the purpose of comparison to the acrylated imines of the instant invention, represented by products 4–16.

EXAMPLE 2

Wheelbox coupon corrosion tests were conducted to evaluate the imine corrosion inhibitors of the present invention, synthesized as described in Example 1, in comparison with conventional corrosion inhibitors. The tests were conducted at 80° C. in a rotary oven. The coupons used were flat and rectangular and made of carbon steel which had been water quenched and hardened. To prepare the coupons, metal surfaces were sand blasted, washed in an alcohol/toluene mixture and dried. Suitably prepared coupons were weighed and placed individually in sample bottles.

The test medium was made up comprising 90% by volume of a seawater brine and 10% by volume of a paraffinic hydrocarbon. If $H_2S$ was used to simulate sulfide conditions, the paraffinic hydrocarbon used was sparged with $H_2S$. Each bottle was dosed with a measured amount of the inhibitor to be tested (10, 25 or 50 ppm). Finally, the coupons were placed in the bottles which were then capped and shaken.

The oven was heated to 80° C. and loaded with the coupon containing bottles. The bottles were rotated in the oven for a period of 24 hours. After cleaning and drying, the coupons were reweighed and a percent corrosion inhibition was calculated using the formula: (average blank weight loss−weight loss of treated coupon/average blank weight loss×100). Each coupon was also visually inspected and the appearance was recorded.

In one set of corrosion tests, the bottle headspace was air. In another set of corrosion tests, additional steps were taken to exclude most of the air. Where a substantially air-free environment was desired, argon was bubbled through both the brine and the hydrocarbon. Each of the inhibitors of Table I did show corrosion inhibition characteristics.

EXAMPLE 3

A "stirred kettle" apparatus was utilized to measure the corrosion inhibition capabilities of the zwitterionic imines under several different fluid flow rates.

The stirred kettle apparatus used consisted of a one liter resin kettle with a four neck removable top. An overhead stirred was used to agitate the fluids and a sparge tube was used to purge the fluids with $N_2$ to remove any $O_2$. A thermocouple and temperature controller were used to monitor/maintain the temperature of the system. The fluids used for the tests consisted of varying ratios of brine and a mineral oil or kerosene. A baseline corrosion rate was measured and the system was then dosed with the corrosion inhibitor. Corrosion rates were measured using a probe with two electrodes (reference and working). The probes were connected to a CORRATER (Rohrbach Instruments, Santa Fe Springs, Calif.), which recorded corrosion rates at periodic intervals. The CORRATER used the method of linear polarization resistance (LPR) to determine corrosion rates. The data was then downloaded to a spreadsheet software program which allowed graphical interpretation of the results. Concentration/dosage for each potential inhibitor tested was the same. Table II illustrates the results, which provide a quantitative measure of corrosion inhibition. Unacrylated imines 1–3 do not perform well at all in this test.

Each test was performed twice so two data points are listed for each reading. Use of the zwitterionic imines 4,7 and 16 results in lower corrosion rate and greater protection than the unacrylated conventional treatment A.

TABLE II

| Inhibitor | Corrosion Rate before | Corrosion Rate after 2 hours | % protection | Corrosion Rate after 14 hours | % protection |
|---|---|---|---|---|---|
| Conventional Formulation A[1] | 395/424 | 302/349 | 23/18 | 76/101 | 81/76 |
| 4 | 516/249 | 136/80 | 74/68 | 59/38 | 89/84 |
| 7 | 489/430 | 133/104 | 73/76 | 61/46 | 88/89 |
| 16 | 532/545 | 182/188 | 66/65 | 47/45 | 91/92 |

[1] = unacrylated conventional inhibitor formulation containing quaternary amine and imidazoline active ingredients, available from Nalco/Exxon Energy Chemicals, L.P. of Sugar Land, Texas The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

Changes can be made in the composition, operation and arrangement of the method of the present invention described herein without departing from the concept and scope of the invention as defined in the following claims:

What is claimed is:

1. A method of inhibiting corrosion in metallic flow lines for carrying fluids comprising: adding to said fluids a corrosion inhibiting amount of a zwitterionic water-soluble substituted imine having the following formula:

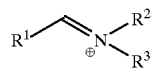

wherein $R^1$ is selected from the group consisting of: heterocyclic groups, heteroaromatic groups, aromatic groups, alkylaryl groups, cycloalkyl groups, straight-chain alkyl groups and branched-chain alkyl groups, $R^2$ is selected from the group consisting of: straight or branched aliphatic hydrocarbon groups, straight or branched unsaturated hydrocarbon groups, alkylidene amines, alkylidene diamines, alcohols, alkyl ethers, thioethers and alkylaryl groups, and $R^3$ is an anion selected from the group consisting of: carboxylates, carbonates, sulfites, sulfates, phosphites and phosphates.

2. The method of claim 1 wherein said zwitterionic imine is of the formula:

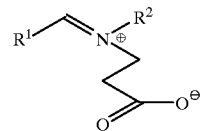

wherein $R^1$ is selected from the group consisting of: heterocyclic groups, heteroaromatic groups, aromatic groups, alkylaryl groups, cycloalkyl groups, straight-chain alkyl groups, and branched-chain alkyl groups and $R^2$ is selected from the group consisting of: straight-chain alkyl groups, branch-chain alkyl groups, alkylidene amines, alkylidene diamines, alcohols, alkyl ethers, thioethers and alkylaryl groups.

3. The method of claim 2 wherein $R^1$ is selected from the group consisting of: benzyl groups, cyclohexyl groups, n-propyl groups, isopropyl groups, dodecyl groups and furanyl groups.

4. The method of claim 3 wherein $R^2$ is selected from the group consisting of: propyl oleyl amine groups, oleyl amine groups, oleyl diamine groups and $C_{12}$–$C_{24}$ straight-chain alkyl groups.

5. The method of claim 2 wherein said zwitterionic imine is selected from the group consisting of: 3-(benzylidene-N-oleyliminium)propionate, 3-(cyclohexylidene-N-oleyliminium)proprionate, 3-(propylidene-N-oleyliminium) propionate, 3-(isopropylidene-N-oleyliminium)propionate, 3-(furylidene-N-oleyliminium)propionate, 3-(benzylidene-N-(oleylaminopropyl)iminium)propionate, 3-(cyclohexylidene-N-(oleylaminopropyl) iminium) propionate, 3-(propylidene-N-(oleylaminopropyl)iminium) and 3-(isopropylidene-N-(oleylaminopropyl)iminium) propionate, 3-(furylidene-N-(oleylaminopropyl)iminium) propionate, 3-(dodecylidene-N-(oleylaminopropyl) iminium) propionate and 3-(dodecylidene-N-(hydroxyethyl) iminium)propionate.

6. The method of claim 1 wherein said zwitterionic imine is added to said flow lines continuously to maintain a corresponding inhibiting dose of from about 1 to about 500 parts per million.

7. The method of claim 1 wherein said zwitterionic imine is added to said flow lines continuously to maintain a corresponding inhibiting dose of from about 1 to about 250 parts per million.

8. The method of claim 1 wherein said flow lines are made of mild steel.

9. The method of claim 1 wherein flow rate of said fluids through said flow lines is from about 0 to about 65 feet per second.

10. The method of claim 1 wherein flow rate of said fluids through said flow lines is from about 0 to about 40 feet per second.

11. The method of claim 1 wherein flow rate of said fluids through said flow lines is from about 0 to about 35 feet per second.

* * * * *